(12) United States Patent
Baughman

(10) Patent No.: US 8,190,539 B2
(45) Date of Patent: May 29, 2012

(54) EVOLUTIONARY FACIAL FEATURE SELECTION

(75) Inventor: Aaron Keith Baughman, Silver Spring, MD (US)

(73) Assignee: International Business Machines Corporation, Armonk, NY (US)

(*) Notice: Subject to any disclaimer, the term of this patent is extended or adjusted under 35 U.S.C. 154(b) by 1007 days.

(21) Appl. No.: 12/137,071

(22) Filed: Jun. 11, 2008

(65) Prior Publication Data

US 2009/0313192 A1    Dec. 17, 2009

(51) Int. Cl.
*G06F 15/18* (2006.01)
*G06N 3/00* (2006.01)
*G06N 3/12* (2006.01)

(52) U.S. Cl. ........................................................ 706/13

(58) Field of Classification Search .................. None
See application file for complete search history.

(56) References Cited

U.S. PATENT DOCUMENTS

| | | | | |
|---|---|---|---|---|
| 7,203,346 | B2* | 4/2007 | Kim et al. ........................ | 382/118 |
| 2004/0017932 | A1* | 1/2004 | Yang .............................. | 382/118 |
| 2006/0083372 | A1* | 4/2006 | Chang et al. ..................... | 380/44 |
| 2007/0094163 | A1* | 4/2007 | Bowerman et al. ............... | 706/13 |
| 2008/0130962 | A1* | 6/2008 | Lee et al. ........................ | 382/118 |

OTHER PUBLICATIONS

'Personalized face verification system using owner specific cluster dependent LDA subspace': Liu, 2004, IEEE, 1051-4651.*
'Evolutionary pursuit and its application to face recognition': Liu, 2000, IEEE, 0162-8828, pp. 570-582.*
'Agglomerative clustering for image segmentation': Mohanta, 2002, IEEE, 1051-4651, pp. 664-667.*
Labe. 'Genetic Algorithms', 2003 [retrieved on May 5, 2010]. Retrieved from the internet:<http://labe.felk.cvut.cz/~obitko/ga/.*
Yan et al., "Discriminant Analysis with Tensor Representation", IEEE, 2005.
Yan et al., "Discriminant Analysis on Embedded Manifold", Microsoft Research Asia, School of Mathematical Sciences, Peking University, Beijing, P.R. China.
Keung, Lap et al., "Gene Expression Data Clustering and Visualization Based on a Binary Hierarchical Clustering Framework", Conferences in Research and Practice in Information Technology Series, vol. 33.
Clausi, D.A., "K-Means Iterative Fisher (KIF) Unsupervised Clustering Algorithm Applied to Image Texture Segmentation", Pattern Recognition Society, 2002.
Liu, Hsien-Chang et al., "Personalized Face Verification System Using Owner-Specific Cluster-Depende Subspace", Pattern Recognition, 2004, vol. 4, pp. 344-347.
Kyperountas et al., "Dynamic Training Using Multistage Clustering for Face Recognition", Pattern Recognition Society, 2007.
Le Duy-Dinh et al., "Boosting Face Retrieval by Using Relevant Set Correlation Clustering", Multimedia and Expo, 2007, IEEE International Conference, Jul. 2007, pp. 524-527.
Belhumeur et al., "Eigenfaces vs. Fisherfaces: Recognition Using Class Specific Linear Projection", IEEE, Jul. 1997, vol. 19, pp. 711-720.

* cited by examiner

*Primary Examiner* — Kakali Chaki
*Assistant Examiner* — Peter Coughlan
(74) *Attorney, Agent, or Firm* — Hoffman Warnick LLC; Douglas A. Lashmit

(57) ABSTRACT

An evolutionary feature selection system and method that determines a feature space for a dataset. A system is disclosed that includes: a system for generating a plurality of chromosomes; an agglomerative K-means clustering system for clustering data into clusters, wherein each of the cluster spaces is associated with a different one of the chromosomes; a linear discriminant analysis system for scoring each of the cluster spaces; and an evolutionary mating system that genetically mutates and mates at least two of the chromosomes associated with the highest scoring cluster spaces, and generates a final chromosome. The final chromosome can thereafter be used to define a feature space in a matching system that attempts to match inputted biometric data with entries in a biometric dataset.

20 Claims, 3 Drawing Sheets

| Position | Trait |
|----------|-------|
| 1 | Blinking |
| 2 | Smiling |
| 3 | Neutral |
| 4 | Glasses |
| 5 | Talking |
| 6 | Pose |
| 7 | Light |
| 8 | Flash |
| 9 | Needs Glasses |
| 10 | Gender |
| 11 | Mustache |
| 12 | Beard |

FIG. 2

CHROM_1: 001010111100       40
CHROM_2: 101011100001
CHROM_3: 111100111000
...
CHROM_n: 100100100000

FIG. 3

EVOLUTIONARY FACIAL FEATURE SELECTION

FIELD OF THE INVENTION

The invention relates generally to processing biometric data sets, and more particularly to a system and method of reducing a search space with an evolutionary computing approach that selects facial features from a data set.

BACKGROUND OF THE INVENTION

Facial recognition techniques continue to evolve as the need for security and identification systems become increasingly important. Attempting to verify (1:1) or identify (1:N) a face with a given gallery data set is challenging.

One such challenge involves identification on very large acquired physiological and behavioral biometric datasets. In particular, there can be dozens of features that may be collected and stored for each sample. As database sizes increase, exhaustive identification searches that attempt to match an inputted set of data with entire biometric meta-feature sets become computationally unmanageable.

Accordingly, a need exists to address the ever growing meta-feature space associated with biometric data sets.

SUMMARY OF THE INVENTION

The present invention addresses the above-mentioned problems, as well as others, by providing an evolutionary computing approach that determines a reduced set of meta-features (i.e., meta-feature space) that can be used for biometric recognition.

In a first aspect, the invention provides an evolutionary feature selection system for determining a meta-feature space, comprising: a system for generating a plurality of chromosomes; an agglomerative K-means clustering system for generating a cluster space for each of the plurality of chromosomes, wherein each cluster space is associated with a different one of the chromosomes and includes a set of clusters; a linear discriminant analysis system for scoring each of the cluster spaces; and an evolutionary mating system that genetically mutates and mates chromosomes in a pairwise fashion based on the scoring of associated cluster spaces, and generates a final chromosome that defines a meta-feature space.

In a second aspect, the invention provides a computer readable medium having a program product stored thereon for defining a meta-feature space from a dataset, comprising: program code for generating a plurality of chromosomes; program code for clustering data from the dataset into cluster spaces using agglomerative K-means clustering, wherein each cluster space is associated with a different one of the chromosomes and includes a set of clusters; program code for scoring each of the cluster spaces using linear discriminant analysis; and program code for genetically mutating and mating chromosomes in a pairwise fashion based on scoring of associated cluster spaces, and for outputting a final chromosome that defines a meta-feature space.

In a third aspect, the invention provides a method of determining a meta-feature space from a dataset, comprising: generating a plurality of chromosomes; clustering data from the dataset into cluster spaces using agglomerative K-means clustering, wherein each cluster space is associated with a different one of the chromosomes and includes a set of clusters; scoring each of the cluster spaces using linear discriminant analysis; genetically mutating and mating the chromosomes in a pairwise fashion based on scoring of associated cluster spaces; and outputting a final chromosome that represents a meta-feature space.

In a fourth aspect, the invention provides a method for deploying a system determining a feature space from a dataset, comprising: providing a computer infrastructure being operable to: generate a plurality of chromosomes; cluster data into cluster spaces using agglomerative K-means clustering, wherein each cluster space is associated with a different one of the chromosomes and includes a set of clusters; score each of the cluster spaces using linear discriminant analysis; and genetically mutate and mate at least two of the chromosomes associated with the highest scoring cluster spaces, and output a final chromosome.

BRIEF DESCRIPTION OF THE DRAWINGS

These and other features of this invention will be more readily understood from the following detailed description of the various aspects of the invention taken in conjunction with the accompanying drawings in which:

FIG. 2 depicts an example set of traits for a chromosome in accordance with an embodiment of the present invention.

FIG. 3 depicts an example set of chromosomes in accordance with an embodiment of the present invention.

DETAILED DESCRIPTION OF THE INVENTION

Figure 1:
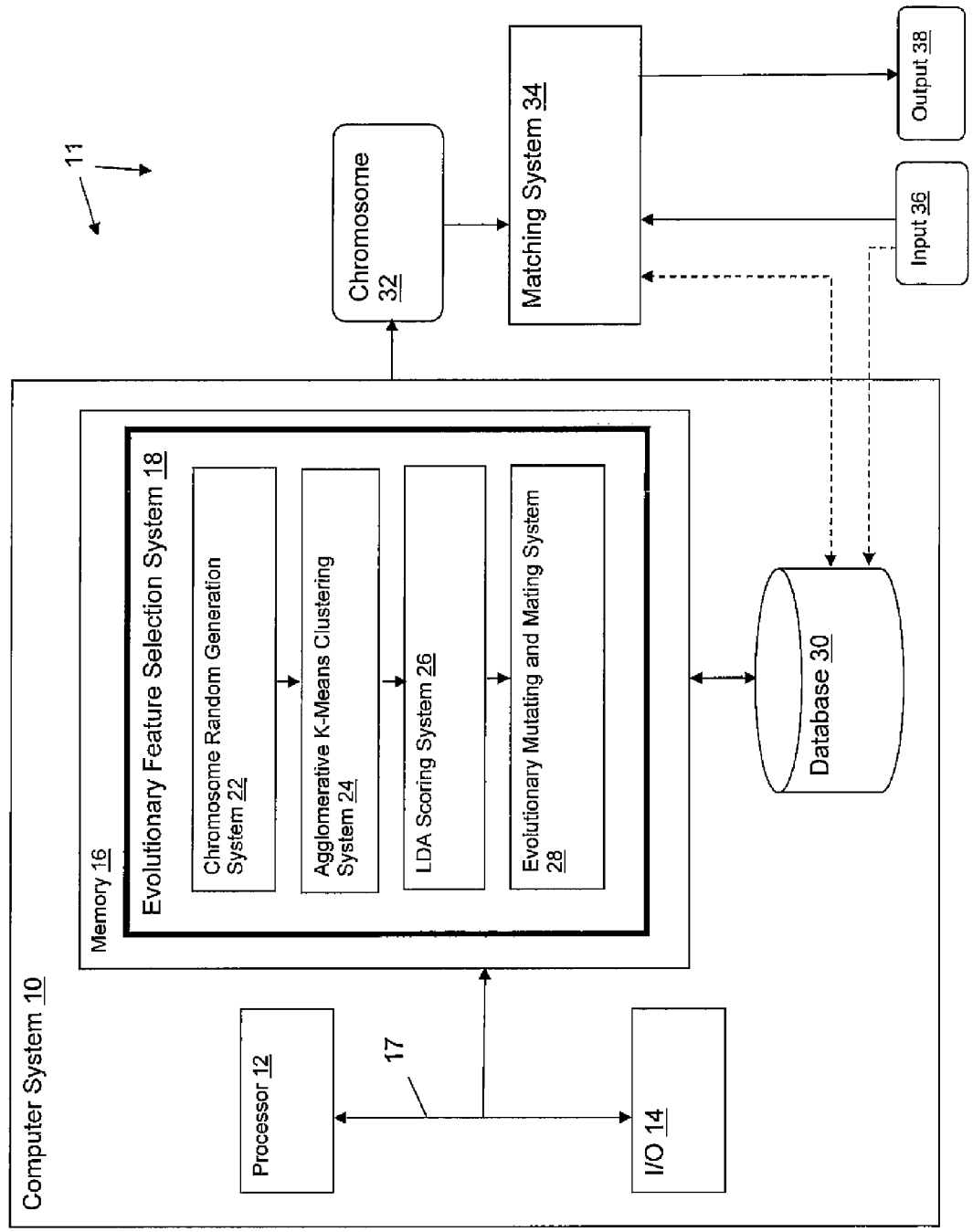
FIG. 1 depicts a biometric recognition infrastructure having a computer system that includes an evolutionary meta-feature selection system in accordance with an embodiment of the present invention.

Referring now to drawings, FIG. 1 depicts a biometric recognition infrastructure 11 having a computer system 10 that includes an evolutionary feature selection system 18 for determining a meta-feature space, i.e., chromosome 32, for use in a matching system 34. Matching system 34 may for instance comprise a facial recognition system that attempts to match an input 36 (e.g., biometric face data) with a dataset of face meta-data stored in database 30. Chromosome 32 determines which of a plurality of possible features should be used in the selection of samples to compare within the matching process. For example, a video surveillance camera may collect video data from individuals passing in front of the camera. Facial features may be collected from an individual and passed as input 36 to matching system 34 to determine an identity or match of the individual. Input 36 may also be stored in the database as a new data element in the dataset. Output 38 may comprise an identity of an individual, or any other type of output (e.g., match or no-match) generated by matching system 34. Note that while the embodiments are generally described herein with reference to processing facial data, it is understood that the evolutionary meta-feature selection system 18 could be utilized to process any type of data.

Evolutionary feature selection system 18 generally includes: a chromosome random generation system 22 for generating a set of initial chromosomes; an agglomerative K-Means clustering system 24 for processing data elements from database 30 to create an associated cluster space for each of the initial chromosomes; a linear discriminant analysis (LDA) system 26 for scoring each of the cluster spaces; and an evolutionary mutating and mating system 28 for evolving all of the chromosomes in a pairwise fashion towards a final chromosome 32.

In one illustrative embodiment involving facial meta-features, a 12 bit chromosome is utilized in which a 0 or 1 can be assigned to each of 12 different traits. An example is shown in FIG. 2, in which there are 12 possible traits or features (e.g., blinking, smiling, neutral, glasses, etc.) that can be utilized. Chromosome random generation system 22 (FIG. 1) generates a set of n random chromosomes 40, as shown in FIG. 3. In one example, chromosome random generation system 22 may generate 10 random chromosomes 40.

Next, agglomerative K-Means clustering system 24 (FIG. 1) is utilized to evaluate each data element in database 30 for cluster membership. For each chromosome 40, agglomerative K-Means clustering system 24 generates an associated cluster space. A cluster space contains a set of (i.e., zero or more) clusters generated by agglomerative K-Means clustering system 24 around a feature selector as encoded by a given chromosome 40. K-means clustering is a grouping algorithm that minimizes the within class scatter or the sum square error. "Agglomerative K-means clustering" provides an algorithm in which each data element is initially a cluster itself. Sequentially, the data elements are then evaluated for cluster membership by the Euclidean distance between its feature vector and each cluster's epicenter. If the sample's smallest distance from a cluster is less than an empirically determined threshold, the data sample is placed into the cluster. Otherwise, a new cluster is formed. The clustering algorithm continues until none of the epicenters move within the cluster space.

Agglomerative K-Means Clustering Pseudo Code

Step 1: Through quasi-supervised learning, determine a threshold value

Step 2: Assign each member to a cluster a) For each member:
  i) Determine the minimum Euclidean distance to a cluster's 12 dimensional centroid
  ii) If the distance is greater than the threshold,
    a. Create a new cluster
    b. Initialize the cluster's epicenter to the new feature vector
  iii) Otherwise, add the member to the closest cluster
    a. Recalculate the cluster 12 dimensional centroid
b) Determine if the cluster epicenters have changed
  i) If true, goto step (a).
  ii) If false, go to step 3.

Step 3: Return the cluster space

The clustering threshold was calculated from the equation:

$$\text{Threshold} = \alpha\sigma, (\sigma \in \Re)$$

A mean vector for the entire dataset is then calculated. Next, a mean distance from the data epicenter describes the average member scatter. The $\alpha$ in the above equation is a scalar that represents which standard deviation $\sigma$, to select as a threshold (in which $\sigma$ is in "$\epsilon$" the set of all real numbes "$\Re$"). A series of agglomerative K-Means threshold experiments can be executed to determine the appropriate selection of $\alpha$.

Once all of the cluster spaces are determined, Linear Discriminant Analysis (LDA) scoring system 26 is utilized to measure a fitness value of each cluster space. LDA may be defined as the maximization of the ratio of between class scatter and within class scatter. The analysis technique strives to maintain tightly coupled members within a class while having high separation between members of differing classes. The within class scatter matrix is defined by:

$$S_w = \sum_{j=1}^{c} \sum_{i=1}^{N_j} (x_i^j - \mu_j)(x_i^j - \mu_j)^T$$

where $X_i^j$ is the ith sample of class j, $\mu_j$ is the mean of class j, c is the number of class, $N_j$ is the number of sample in class j. The between class scatter matrix is defined by:

$$S_b = \sum_{j=1}^{c} (\mu_j - \mu)(\mu_j - \mu)^T$$

where $\mu$ represents the mean of all classes. The maximization of between class scatter and the minimization of within class scatter is defined by:

$$\frac{S_b}{S_w}$$

Often, LDA is used for both class discrimination and an algorithm for dimensionality reduction. The most discriminating features that inherently maintain the Fisher property are kept. The selected feature vectors are used for facial recognition.

The following evaluation function may for instance be utilized by LDA scoring system 26 with the pseudo code that follows.

$$\frac{\sum_{j=1}^{cb}(\mu_j - \mu)(\mu_j - \mu)^T}{\sum_{j=1}^{Ca}\sum_{i=1}^{Cb}(x_i^b - \mu_j^a)(x_i^b - \mu_j^a)^T}$$

Linear Discriminant Analysis Pseudo Code

Step 1: Retrieve all of the cluster spaces

Step 2: Calculate the LDA score for each cluster
  For each cluster:
    i) Calculate the within class scatter
    ii) Calculate the between class scatter
    iii) Compute the ratio of step ii to step i Step 3: Return LDA scores Evolutionary mutating and mating system 28 genetically mates the top two chromosomes based on LDA scores. The mating can occur for some number of generations until a final chromosome 32 is determined. For instance, either a predefined number of generations (e.g., 25) may be utilized, or some other criteria, such as convergence, could be used. Mutating and mating may be accomplished using genetic operators with the following definitions: Evolutionary Automaton={xi, X, CP(x), G, E(xi),O} xi is a chromosome where $$|x_j|=12$$

X is a population={x0 . . . xn} where $$|X|=10$$

CP(X) is a cluster space where $$CP(X)=\{c_0 \ldots c_n\}$$

$c_k$=centroid

G is a generation $\{g0 \ldots gn\}$ where $|G|=25$

E(xi) is an evaluation function where $$\frac{S_b}{S_w}$$

O are operators $\{O0, O1\}$ where $O_o = \text{crossoverType}(x_j, x_i, P(\text{crossover}))$ $O_1 = \text{mutate}(x_j, P(\text{mutation}))$ Note that the above is an illustrative embodiment, and that the genetic mutating and mating scheme could be altered without departing from the scope of the invention.

In one illustrative embodiment, Evolution Computation in Java (ECJ) may be employed. ECJ is a research evolutionary computing system developed by George Mason University's Evolutionary Computation Laboratory (see, e.g., ECJ. http://cs.gmu.edu/~eclab/tools.html.). ECJ provides genetic algorithms, generational evolution, flexible breeding architecture, multiple selection operators and population evolution that are defined within a parameter file and loaded at runtime.

Figure 4:
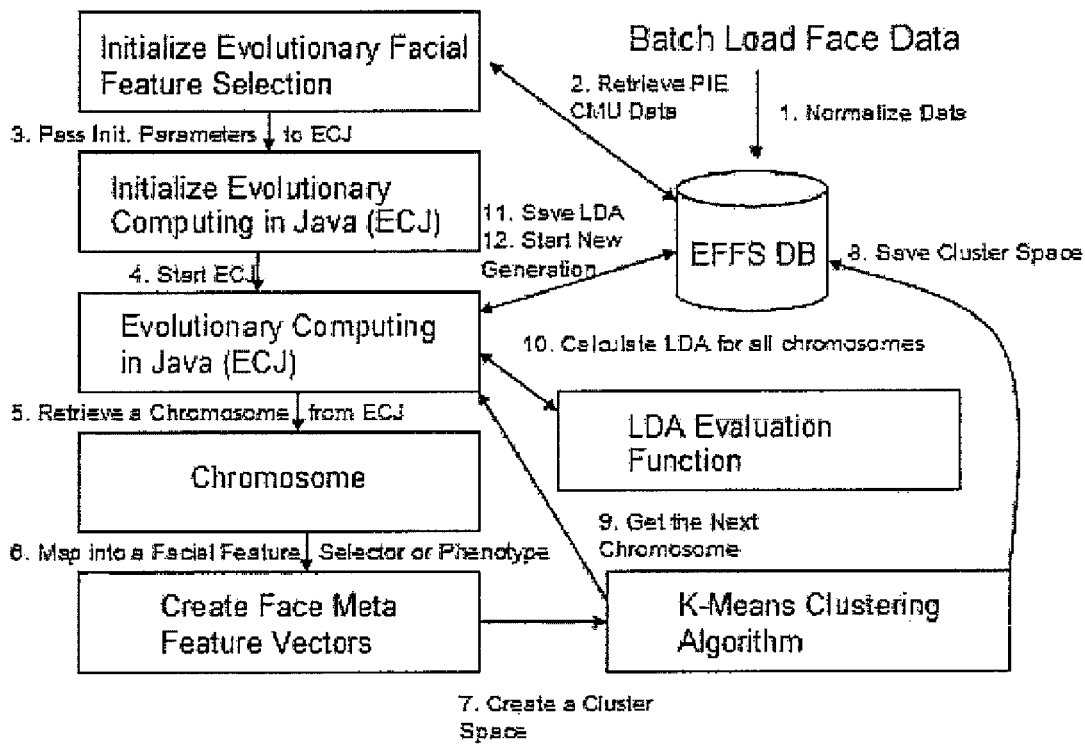
FIG. 4 depicts a flow diagram showing an evolutionary computing in Java process in accordance with an embodiment of the present invention.

FIG. 4 shows the overall system architecture of the evolutionary approach. All of the biometric data is first normalized and loaded into a database (EFFS DB), [1,2]. The feature vectors of each face are retrieved from the database and placed into a system context. An ECJ parameter file is written to disk that is used to initialize the evolutionary environment [3, 4]. Initialization includes the generation of chromosomes. Each chromosome is retrieved from ECJ and mapped into a facial feature selector vector [5, 6]. The vectors are input into the agglomerative K-Means clustering algorithm. A cluster space is generated and tagged to a facial meta-feature selector with the associated chromosome [7]. The tagging and cluster spaces are saved into a database [8]. After all cluster spaces are created and saved, the LDA evaluation function scores each cluster space [9, 10]. The LDA scores of the cluster spaces are stored into the database [11]. ECJ crosses/mates the top two chromosomes based on LDA score rank and continues in a pair wise mating scheme. The mating continues until all generations are completed [12].

As shown in FIG. 1, computer system 10 (as well as matching system 34) may be implemented using any type of computing device, and may be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including a computer readable medium such as a magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising evolutionary feature selection system 18 could be created, maintained and/or deployed by a service provider that offers the functions described herein for customers. That is, a service provider could offer to provide feature space processing as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. An evolutionary feature selection system for determining a meta-feature space, comprising:
   a computing device, including:
      a system for generating a plurality of chromosomes;
      an agglomerative K-means clustering system for generating a cluster space for each of the plurality of chromosomes,
      wherein the generating of the cluster space includes evaluating data elements for cluster membership based on a minimum Euclidean distance between a feature vector of a data element and a multi-dimensional centroid of each cluster,
      wherein each cluster space is associated with a different one of the chromosomes and includes a set of clusters;
      a linear discriminant analysis system for scoring each of the cluster spaces,
      wherein the linear discriminant analysis system determines a score based on a ratio maximization of between class scatter and within class scatter; and
      an evolutionary mating system that performs the following:
         genetically mutates and mates chromosomes in a pairwise fashion based on the scoring of associated cluster spaces,
         wherein the genetically mutating and mating of the chromosomes includes continuously mating a top two scoring chromosomes in the chromosomes as a pair; and
         generates a final chromosome that defines a meta-feature space after completion of the continuously mating.

2. The evolutionary feature selection system of claim 1, wherein each chromosome comprises a binary string having a plurality of bits, wherein each bit represents a presence or absence of a biometric trait.

3. The evolutionary feature selection system of claim 2, wherein each biometric trait represents a facial feature.

4. The evolutionary feature selection system of claim 1, wherein the data comprises a dataset of facial features.

5. The evolutionary feature selection system of claim 1, wherein the plurality of chromosomes are generated randomly.

6. The system of claim 1, wherein the evolutionary mating system continuously mates the top two scoring chromosomes for a predefined number of generations.

7. A non-transitory computer readable medium having a program product stored thereon for defining a meta-feature space from a dataset, comprising program code for:
   generating a plurality of chromosomes;
   clustering data from the dataset into cluster spaces using agglomerative K-means clustering,
   wherein the clustering includes evaluating data elements for cluster membership based on a minimum Euclidean distance between a feature vector of a data element and a multi-dimensional centroid of each cluster,
   wherein each cluster space is associated with a different one of the chromosomes and includes a set of clusters;
   scoring each of the cluster spaces using linear discriminant analysis,
   wherein the linear discriminant analysis determines a score based on a ratio maximization of between class scatter and within class scatter; and
   genetically mutating and mating chromosomes in a pairwise fashion based on scoring of associated cluster spaces,
   wherein the genetically mutating and mating of the chromosomes includes continuously mating a top two scoring chromosomes in the chromosomes as a pair; and
   outputting a final chromosome that defines a meta-feature space after completion of the continuously mating.

8. The computer readable medium of claim 7, wherein each chromosome comprises a binary string having a plurality of bits, and wherein each bit represents a presence or absence of a biometric trait.

9. The computer readable medium of claim 8, wherein each biometric trait represents a facial feature.

10. The computer readable medium of claim 7, wherein the data comprises a dataset of facial features.

11. The computer readable medium of claim 7, wherein the plurality of chromosomes are generated randomly.

12. The program product of claim 7, wherein the continuously mating of the top two scoring chromosomes is performed for a predefined number of generations.

13. A method of determining a meta-feature space from a dataset, comprising:
   generating a plurality of chromosomes;
   clustering data from the dataset into cluster spaces using agglomerative K-means clustering,
   wherein the clustering includes evaluating data elements for cluster membership based on a minimum Euclidean distance between a feature vector of a data element and a multi-dimensional centroid of each cluster,
   wherein each cluster space is associated with a different one of the chromosomes and includes a set of clusters;
   scoring each of the cluster spaces using linear discriminant analysis,
   wherein the linear discriminant analysis determines a score based on a ratio maximization of between class scatter and within class scatter;
   genetically mutating and mating the chromosomes in a pairwise fashion based on scoring of associated cluster spaces,
   wherein the genetically mutating and mating of the chromosomes includes continuously mating a top two scoring chromosomes in the chromosomes as a pair; and
   outputting a final chromosome that represents a meta-feature space after completion of the continuously mating.

14. The method of claim 13, wherein each chromosome comprises a binary string having a plurality of bits, and wherein each bit represents a presence or absence of a biometric trait.

15. The method of claim 14, wherein each biometric trait represents a facial feature.

16. The method of claim 13, wherein the dataset comprises a dataset of facial features.

17. The method of claim 13, wherein the plurality of chromosomes are generated randomly.

18. The method of claim 13, further comprising:
   submitting the final chromosome to a matching system;
   using the chromosome for matching inputted biometric data with a dataset of biometric features.

19. The method of claim 13, wherein the continuously mating of the top two scoring chromosomes is performed for a predefined number of generations.

20. A method for deploying a system determining a feature space from a dataset, comprising:
   providing a computer infrastructure being operable to:
      generate a plurality of chromosomes;
      cluster data into cluster spaces using agglomerative K-means clustering,
      wherein the clustering includes evaluating data elements for cluster membership based on a minimum Euclidean distance between a feature vector of a data element and a multi-dimensional centroid of each cluster, wherein each cluster space is associated with a different one of the chromosomes and includes a set of clusters;

score each of the cluster spaces using linear discriminant analysis, wherein the linear discriminant analysis determines a score based on a ratio maximization of between class scatter and within class scatter; and genetically mutate and mate at least two of the chromosomes associated with highest scoring cluster spaces, wherein the genetically mutating and mating of the at least two of the chromosomes includes continuously mating a top two scoring chromosomes in the chromosomes as a pair; and output a final chromosome after completion of the continuously mating.

* * * * *